United States Patent [19]
Whetten et al.
[11] 3,991,312
[45] Nov. 9, 1976

[54] IONIZATION CHAMBER

[75] Inventors: Nathan Rey Whetten, Burnt Hills; Charles Zubal, Schenectady, both of N.Y.

[73] Assignee: General Electric Company, Schenectady, N.Y.

[22] Filed: Nov. 25, 1975

[21] Appl. No.: 635,144

[52] U.S. Cl. .......... 250/385
[51] Int. Cl.$^2$ .......... G01T 1/18
[58] Field of Search .......... 250/374, 375, 385, 389

[56] References Cited

UNITED STATES PATENTS 2,899,582 8/1959 Hermsen et al. .......... 250/385 X
3,385,988 5/1968 Hyun .......... 250/385 X

*Primary Examiner*—Davis L. Willis
*Attorney, Agent, or Firm*—Jack E. Haken; Joseph T. Cohen; Jerome C. Squillaro

[57] ABSTRACT

An improved ionization chamber type x-ray detector comprises an array of substantially parallel, flat metal plate electrodes separated and supported by sheets of a glass fiber reinforced silicone dielectric. The silicone-glass fiber dielectric substantially reduces the microphonic and photoconductive currents which characterized prior art detector arrays.

4 Claims, 3 Drawing Figures

IONIZATION CHAMBER

BACKGROUND OF THE INVENTION

This invention concerns ionization chamber x-ray detectors. More specifically, this invention concerns improved one-dimensional arrays of parallel plate ionization chambers.

U.S. patent application, Ser. No. 544,171 (now abandoned) and Ser. No. 616,930 by John M. Houston and Nathan R. Whetten, which are assigned to the assignee of this invention, describe arrays of ionization chamber type x-ray detectors which incorporate high pressure xenon gas. A preferred embodiment of those detectors comprises a linear array of parallel plate electrodes defining a series of spatially distinct detection cells. Alternate electrode plates in the array are connected to electronic current sensors to produce signals which may be utilized to calculate a spatial distribution of x-ray intensity. Detectors of this type, by way of example, are particularly suited for use in computerized x-ray axial tomography systems.

The parallel plate electrodes of the above-described detector array operate in close proximity at relatively large potential difference. Mechanical vibration transmitted to the plates may, therefore, significantly vary the capacitance between electrodes and thus introduce microphonic current changes which are detected in the current sensing electronics and may introduce errors into an x-ray measurement. Glass or ceramic insulators, which are commonly used for mounting electrodes in ionization chambers, tend to transmit such mechanical vibrations to the detector electrodes.

Plastic resins and composite materials have been used to support and insulate electrodes in ionization chambers. Many dielectrics of the prior art exhibit relatively high photoconductive effects in the presence of x-ray electromagnetic energy. These photoconductive currents combine with the ionization current in the xenon gas to produce errors in the output signals of the above-described detector array.

SUMMARY OF THE INVENTION

In accordance with the present invention we provide an improved multi-cell, parallel plate ionization chamber array. Electrodes of the array are separated and insulated with plates of silicone resin reinforced with glass fiber strands. The silicone resin is sufficiently elastic to dampen mechanical vibrations which would otherwise be transmitted along the detector array. We have, furthermore, determined that x-ray photoconductive currents in our silicone-glass fiber dielectric are several order of magnitude less than those in other, prior art, dielectric resins. The use of silicone-glass fiber material tends, therefore, to reduce error signals originating in the dielectric insulator.

It is, therefore, an object of this invention to provide ionization chamber arrays which are relatively insensitive to microphonic currents;

Another object of this invention is to provide ionization chamber arrays which are relatively insensitive to the error producing effects of x-ray photoconductivity.

BRIEF DESCRIPTION OF THE DRAWING

The novel features believed characteristic of the present invention are set forth in the appended claims. The invention itself, together with further objects and advantages thereof, may best be understood with reference to the following detailed description taken in connection with the appended drawings in which:

DESCRIPTION OF THE PREFERRED EMBODIMENTS

The above-referenced patent applications by John M. Houston and Nathan R. Whetten describe an array of ionization chambers for use with x-ray tomography equipment and are incorporated by reference herein. The detectors comprise parallel plate electrodes supported within a mass of xenon detector gas having a pressure from approximately 10 atmospheres to approximately 50 atmospheres. X-ray photons impinging on the detector gas produce electron-ion pairs between the electrode plates. An electric potential applied between adjacent plates attracts the electrons and ions to opposite electrodes producing a net electric current flow between them. Electric current flow between the electrodes is thus a function of the total number of x-ray photons interacting in the vicinity of those electrodes. The x-ray detectors of that invention operate in the ionization chamber region: that is, the electric current flow in a detector cell is a linear function of the x-ray intensity in that cell; the electric field being insufficient to cause charge carrier multiplication.

The electrodes of the above-mentioned detector array form a closely spaced parallel plate capacitor operating at a relatively large potential difference. Mechanical vibration of the plates tends to vary the capacitance between them and thus to induce microphonic current flow in external detector circuits. This phenomenon is, in many respects, similar to the operation of a condenser microphone and tends to introduce significant random error currents in the output of the detector array.

The parallel plate electrodes in the aforementioned array are supported and insulated by dielectric posts which may, for example, comprise glass, ceramic, or plastic resins. X-ray photons which impinge on the dielectric posts induce photocurrents which flow between the electrodes and are indistinguishable from ionization currents in the xenon gas. These photocurrents may also contribute to measurement errors which may, for example, interfere with accurate measurement and imaging of tomographic x-ray transmission data.

Figure 1:
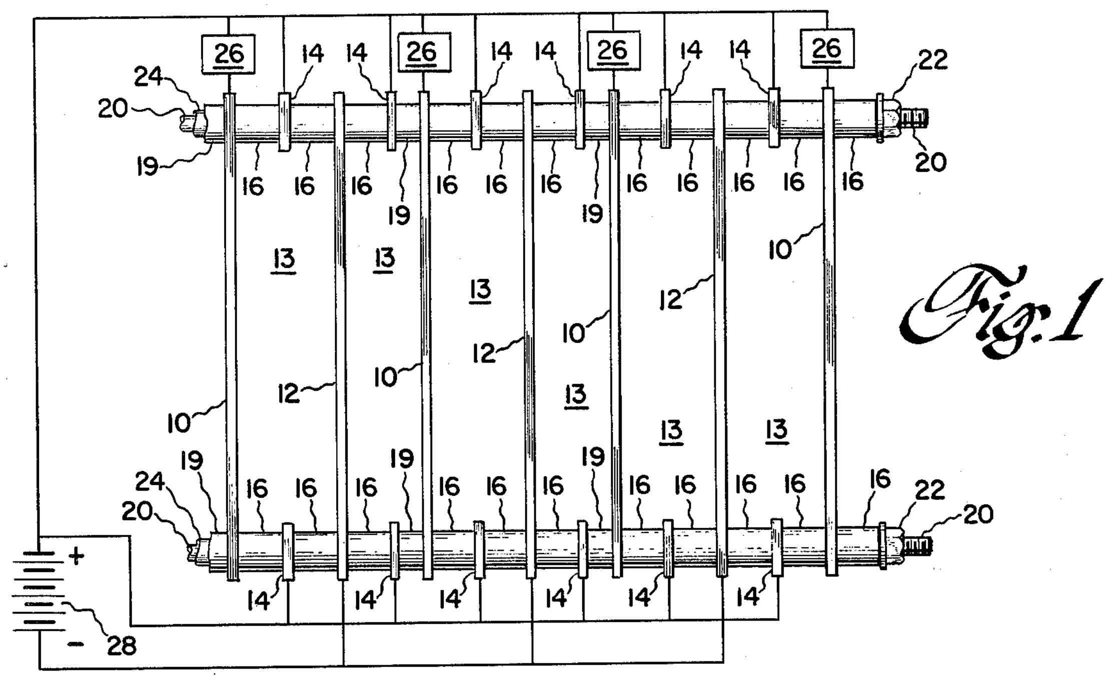
FIG. 1 is a top view of an ionization chamber array of the present invention.
Figure 2:
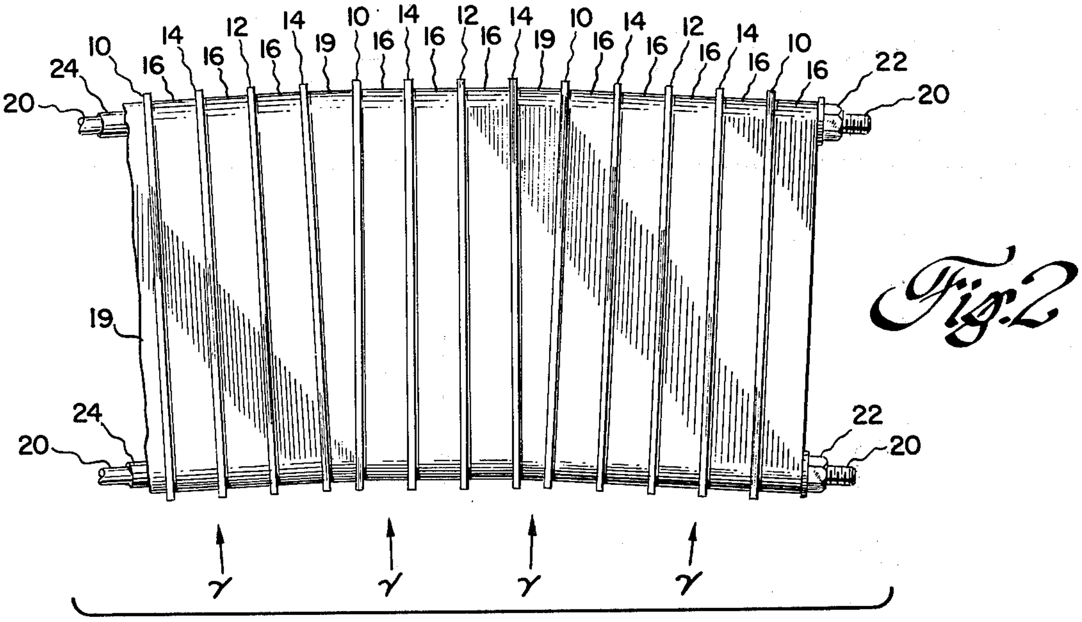
FIG. 2 is a side view of the detector array of FIG. 1.
Figure 3:
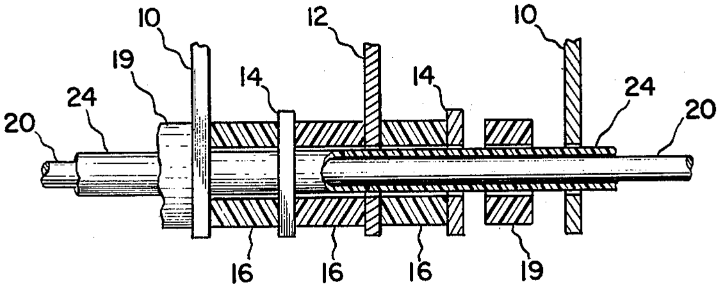
FIG. 3 is a partial sectional view of the support structure utilized in the array of FIGS. 1 and 2.

FIGS. 1, 2, and 3 are an improved ionization chamber array of the present invention. A plurality of parallel metal plate cathodes 12 are stacked on support rods 20 between parallel metal anodes 10. The anodes 10 and cathodes 12 are separated by dielectric sheets 16 and 19 (more particularly described below) to form substantially parallel detector cells 13. Guard ring electrodes 14 are disposed in the insulators 16 and 19 between the parallel electrodes 10 and 12 to drain surface currents which might otherwise interfere with detector measurements. The anodes 10, cathodes 12, insulators 16, 19, and guard rings 14 are stacked on metallic support rods 20 and maintained under compression by nuts 22. Each anode 10 is electrically connected to a current sensing circuit 26 which produces an output signal proportional to the current flowing from that anode. The cathodes 12 are connected in parallel to the negative terminal of a potential source 28. The positive terminal of the potential source 28 is connected to the guard rings 14 and to the current sensing circuit 26 in series with the anodes 10.

The insulators 16 and 19 comprise sheets of silicone resin reinforced with glass fibers. By way of example, the insulators 16 and 19 may comprise Fiberglass reinforced silicone resin (of NEMA grade G-7) produced by the American Cyanamid Co., Wayne, New Jersey. We have determined that this material is relatively insensitive to photocurrents induced by x-ray photons. By way of example, the photocurrents induced by an 8mR/sec, 90 KVP x-ray beam in samples of common insulators in vacuum are indicated in Table I.

Table I

| | Material | Voltage | Photocurrent |
|---|---|---|---|
| I | 0.75 mm Teflon (polytetrafluoroethylene) sheet | 400 v | $1.1 \times 10^{-11}$ amp |
| II | acrylic plastic rod | 400 v | $1.6 \times 10^{-11}$ amp |
| III | silicone-Fiberglass sheet (G-7) | 400 v | $\sim 1 \times 10^{-13}$ amp |

The silicone-glass fiber insulation of the present invention is, therefore, from one to two orders of magnitude more resistant to x-ray photoconductive effects than are common insulating plastics of the prior art. The dielectric is, also, relatively elastic and tends to damp out vibrations in the electrode plates which might otherwise contribute to the generation of microphonic currents in the detector.

It is often desirable to curve detector arrays so that x-ray photons emanating from an approximate point source will enter the various cells in a direction relatively parallel to the detector plates. The volume of detector gas interacting with the x-ray photons and the efficiency of the detector array are thereby increased. The array of the present invention may be curved in this manner by tapering some or all of the dielectric sheets 19 to provide angular separation between adjacent bands of detector signals. The metal support rods 20 may be curved to conform to the radius of the detector array and may be insulated with a sleeve 24 of nylon or other dielectric material.

By way of example and to permit others to more easily practice this invention, a typical array comprises 127 detector cells spaced on approximately 3.7 mm centers. The individual cathode and anode plates comprise 0.05 mm thick tungsten or molybdenum. Every fourth silicone-glass fiber insulator of the array 19 is ground to a taper to produce a slight curvature whereby the array may be focused on a point x-ray source of the type utilized for axial x-ray tomography.

The mechanical construction and silicone-glass fiber insulating material of the present invention allows the construction of ionization chamber arrays which are substantially less sensitive to microphonic and photoelectric current errors than were arrays of the prior art.

While the invention has been described with reference to a preferred embodiment, many modifications and changes will readily occur to those skilled in the art. For example, the individual electrodes of the detector array have been described herein as cathodes and anodes. It is to be understood, however, that the polarity of the electrodes may be reversed or other changes made without significantly affecting the operation of the detectors. Accordingly, the appended claims are intended to cover all such modifications or changes as fall within the sphere and scope of the invention.

The invention claimed is:

1. In an array of ionization chamber cells of the type comprising substantially parallel metal plate cathodes disposed equi-distant between substantially parallel metal plate anodes, the improvement comprising:
dielectric sheets comprising of a composite of silicone resin and glass fibers disposed between and adjacent said anodes and said cathodes whereby microphonic vibrations of said cathodes and said anodes are reduced and x-ray induced photocurrents between said cathodes and said anodes are substantially eliminated.

2. The improved detector of claim 1 wherein said dielectric sheets extend along the entire length of said cathodes and said anodes substantially parallel to the direction of an incident x-ray beam.

3. The improved detector of claim 1 wherein one or more of said dielectric sheets taper in a plane substantially parallel to an incident x-ray beam whereby angular separation is achieved between adjacent detector cells.

4. The improved detector of claim 3 further comprising conductive guard rings disposed in said dielectric sheets between said anodes and said cathodes and a source of electric potential connected to maintain said anodes and said guard electrodes at a first potential, with respect to said cathodes, whereby electrons and ions generated between said cathodes and said anodes are attracted thereto and leakage currents in said insulators are drained to said guard electrodes.

* * * * *